United States Patent [19]

Fizmaurice

[11] 3,724,758
[45] Apr. 3, 1973

[54] BOOM IRRIGATION SYSTEM

[75] Inventor: Richard W. Fizmaurice, Santa Clara, Calif.

[73] Assignee: FMC Corporation, San Jose, Calif.

[22] Filed: Dec. 6, 1971

[21] Appl. No.: 204,973

[52] U.S. Cl.................239/251, 239/177, 239/254, 239/261
[51] Int. Cl. .............................................B05b 3/06
[58] Field of Search......239/225, 251, 254, 261, 177; 137/344

[56] References Cited

UNITED STATES PATENTS

| | | | |
|---|---|---|---|
| 2,301,025 | 11/1942 | Friend et al. | 239/254 X |
| 2,956,750 | 10/1960 | Singer et al. | 239/261 X |
| 2,964,247 | 12/1960 | Maasdam | 239/251 |
| 2,988,287 | 6/1961 | Sherman | 239/243 |
| 2,996,197 | 8/1961 | Smenl | 239/261 |
| 3,066,871 | 12/1962 | Born | 239/25 X |
| 3,134,397 | 5/1964 | Moulton | 239/261 |

Primary Examiner—Lloyd L. King
Attorney—F. W. Anderson et al.

[57] ABSTRACT

A low application rate boom type irrigation system permanently placed in a field includes two upwardly bowed wings supported by guy wires and rotated about a vertical axis. The boom is rotated by water being discharged in opposite directions from spray nozzles on the two wings aided by wind engaging flaps pivotally supported by each wing. Each boom includes an outer structural tube and an inner water carrying tube which inner tubes are connected to a water supply source through a screen housing having a plurality of commonly directed chevron seals for simplifying assembly and cleaning. A pair of boom aligning stands stop the wings in positions parallel with the water supply line when the system is not in operation to provide clearance for cultivation, and hydraulically releases the boom for rotation in response to water pressure in the system equal to that required for irrigation.

19 Claims, 14 Drawing Figures

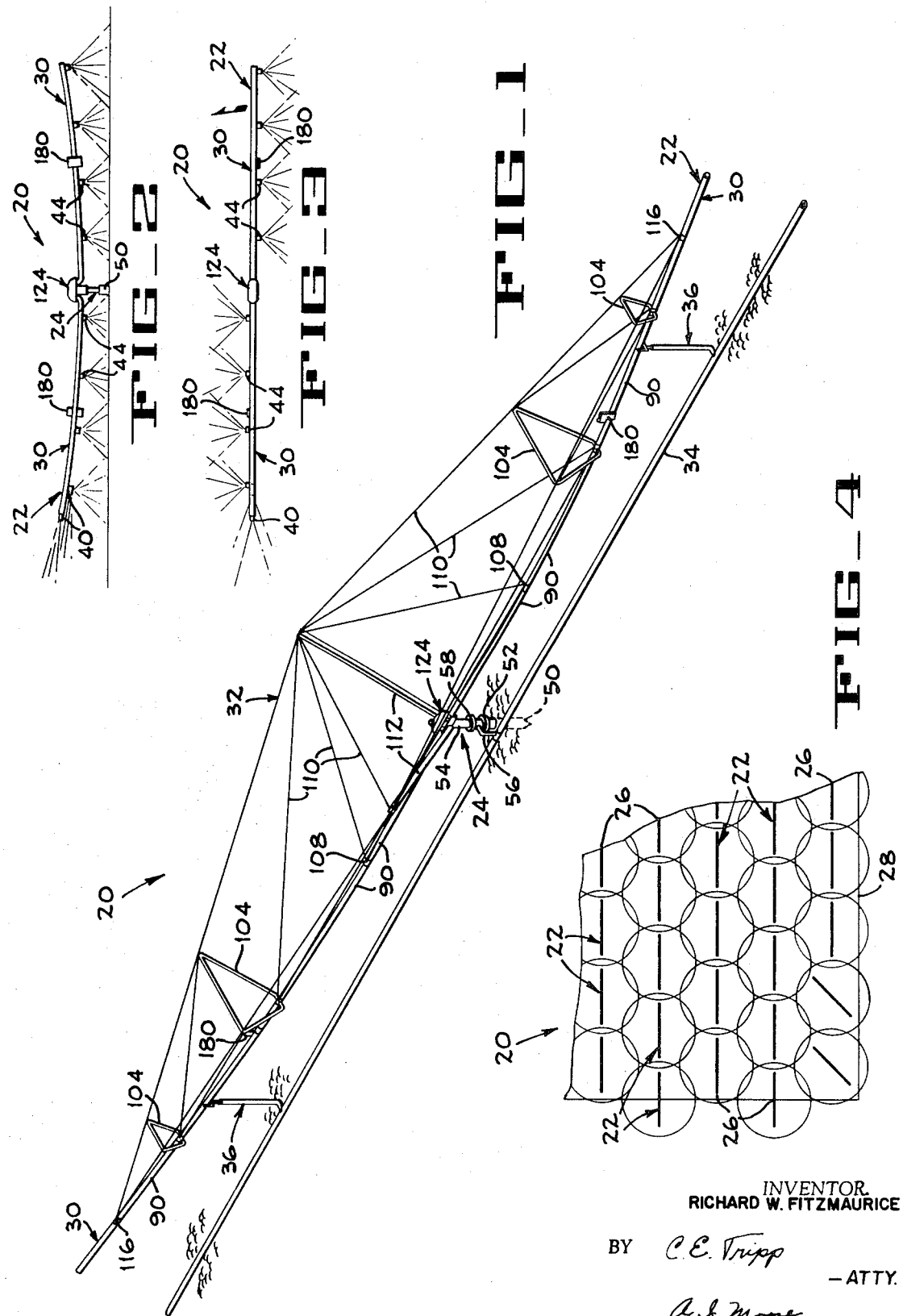

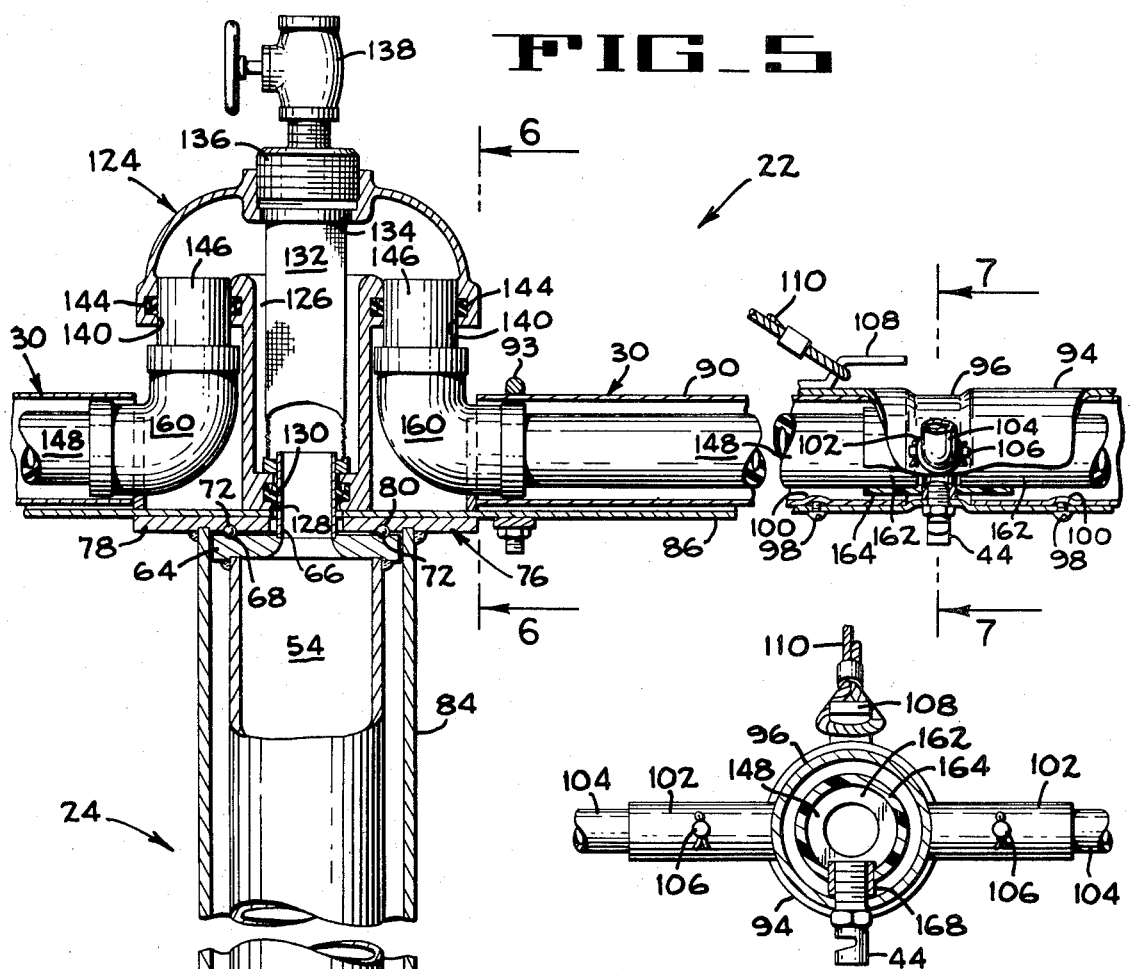
FIG_5
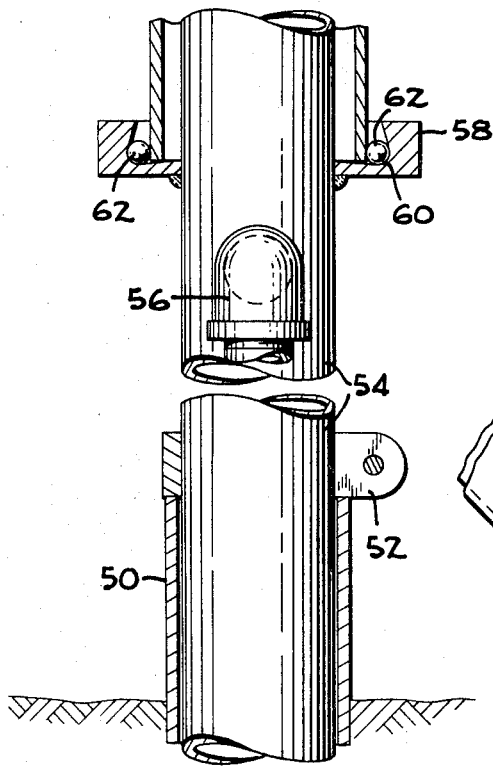
FIG_6
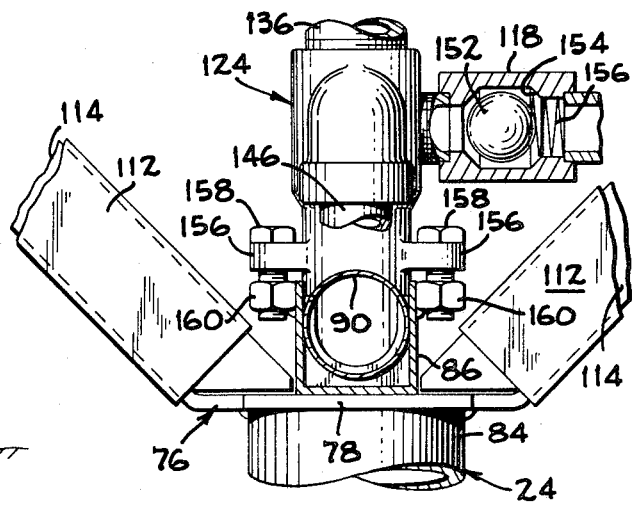
FIG_7

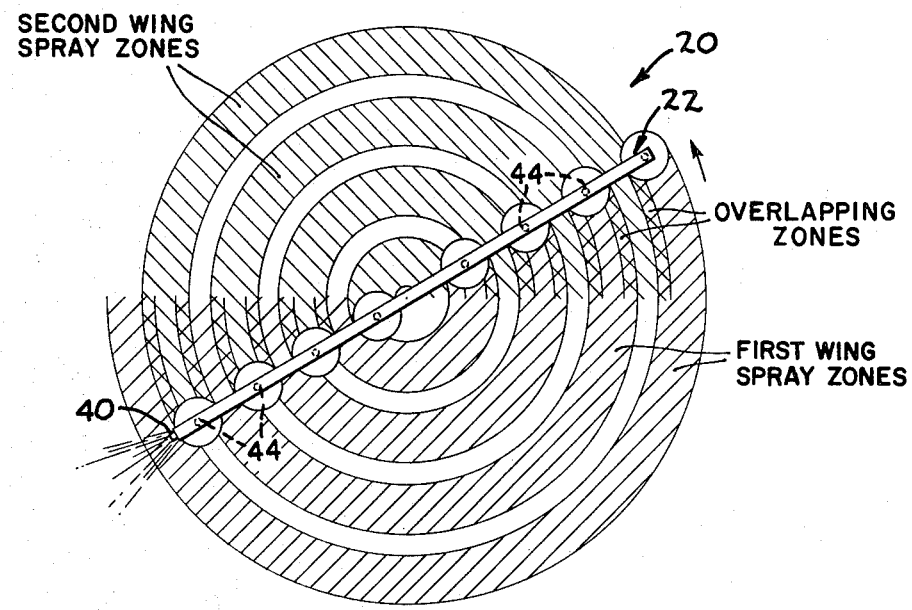
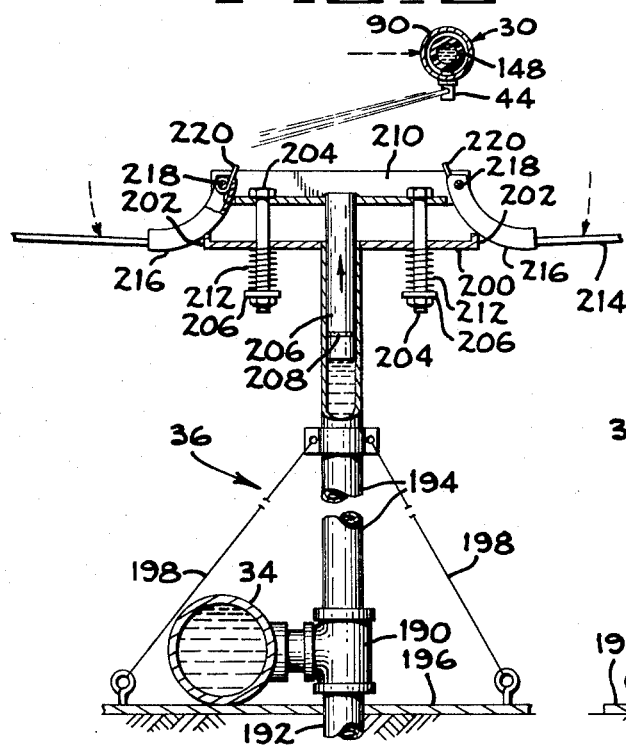
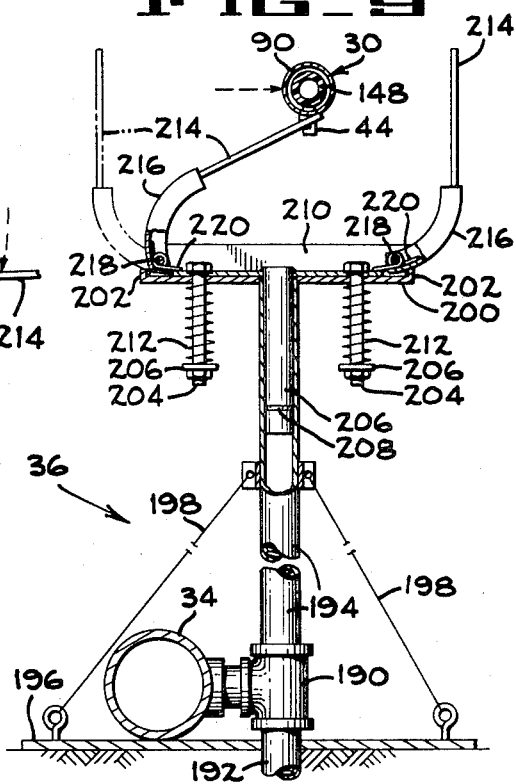

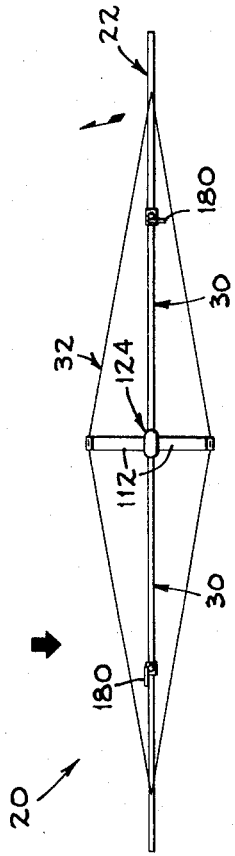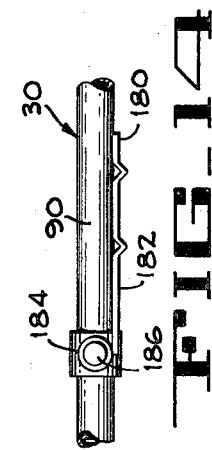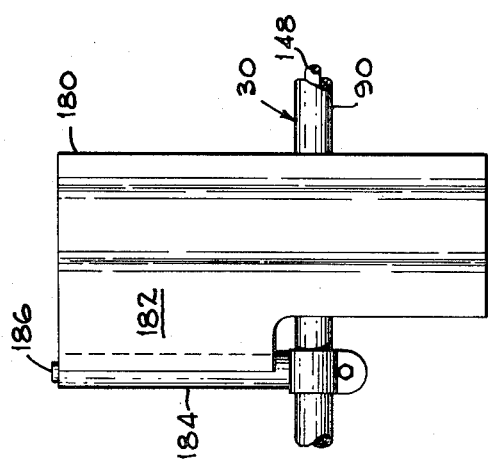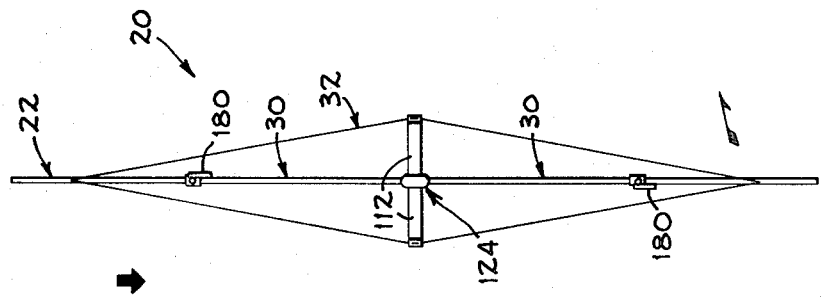

BOOM IRRIGATION SYSTEM

BACKGROUND OF THE INVENTION

1. Field of the Invention

This invention pertains to the sprinkler irrigation art and more particularly relates to a low application rate boom type irrigation system having a plurality of elongated boom systems permanently positioned, at least for the duration of the annual irrigation requirement, in a field to be irrigated with each boom being rotated about a fixed vertical axis.

2. Description of the Prior Art

Boom type irrigation systems which are mounted on wheels for movement in a linear path or about a central pivot axis are well known in the art. Sherman U.S. Pat. No. 2,988,287 and Moulton U.S. Pat. No. 3,134,397, for example, disclose such wheel mounted, non-permanent systems. Apparently the high cost of these prior art systems dictates the necessity of moving one rotary boom system from place to place with resulting damage to equipment and to the plants crushed by the wheels; as opposed to permanently mounting a plurality of inexpensive, light weight rotary boom systems in the field and above the crop being irrigated so that no damage will occur.

SUMMARY OF THE INVENTION

In accordance with the broad concept of the present invention, a plurality of light weight inexpensive rotary irrigation booms which apply water at low rates are permanently installed in predetermined spaced relationship in the field to perform the irrigation operations when required. The weight and expense of each boom is reduced by providing a small diameter water conduit system disposed within a larger diameter structural system, which structural system is bowed upwardly by a system of guy wires. A unique screen assembly is provided in each boom in order to provide for ease in assembly and cleaning. Also, automatic boom aligning stands are provided for locking all booms in in-line positions with the water supply conduits to permit cultivation and other farm activities to take place without interference with the elongated booms.

It is therefore one object of the present invention to provide a permanently installed rotary boom type irrigation system for applying water at low application rates to the soil.

Another object is to provide a boom type system having boom alignments stands which automatically release the booms for rotation upon application of water pressure and which automatically lock the booms in alignment in response to turning off the water supply.

Another object is to provide an irrigation system which reduces equipment damage and also transportation and water jet damage to the plants being irrigated.

Another object is to provide a low irrigation rate boom type irrigation system which is effective in frost control use.

BRIEF DESCRIPTION OF THE DRAWINGS

FIG. 1 is a diagrammatic perspective of one of the rotary booms of the present invention held in an inoperative position in line with the main supply pipe line by a pair of aligning stands.

FIG. 2 is a diagrammatic side elevation of the apparatus of FIG. 1.

FIG. 3 is a diagrammatic plan of the boom of FIG. 1.

FIG. 4 is a diagrammatic plan illustrating a field having a plurality of boom systems permanently installed therein, all but two of said booms being shown with the booms locked in their aligned inoperative positions.

FIG. 5 is an enlarged vertical section of the vertical mast about which the boom is rotated, and also illustrates the screen housing and adjacent structure.

FIG. 6 is a section taken along lines 6—6 of FIG. 5 illustrating a drain valve.

FIG. 7 is a section taken along line 7—7 of FIG. 5 illustrating the structure for connecting one of the sprinkler heads to the small diameter water conduit in one wing of the boom.

FIG. 8 is an elevation with certain parts cut away and other parts in section illustrating one of the boom aligning stands hydraulically held in its boom releasing position.

FIG. 9 is an elevation similar to FIG. 8 but illustrating one of the boom wings entering the stand for alignment.

FIG. 10 is a diagrammatic elevation illustrating the annular spray patterns and the positions of the nozzles on the two wings of the boom relative to the axis of rotation of the boom.

FIGS. 11 and 12 are operational views illustrating the direction of the prevailing wind and the position of wind engaging flaps when the boom is in two of its operative positions.

FIG. 13 is an enlarged elevation of one of the flaps.

FIG. 14 is a plan of the flap of FIG. 13.

DESCRIPTION OF THE PREFERRED EMBODIMENT

The boom irrigation system 20 (FIGS. 1–4) of the present invention includes a plurality of rotary booms 22 which are rotatable about the vertical axes of masts 24 that are permanently positioned in rows 26 in a field 28 to be irrigated so that the water sprayed from all of the rotary booms 22 combined will irrigate the entire field. Each boom includes two elongated wings 30 that are bowed upwardly by a guy wire assembly 32 (FIG. 1). Water is supplied to the wings 30 through the tubular mast 24 at an irrigation pressure within the range of about 40–110 psi, from a main water supply conduit 34 that is connected to a pump and supply of water (not shown). A pair of boom aligning stands 36 are also connected to the main supply conduit 34 for holding the wings 30 in alignment with a supply conduit 34 when the boom irrigation system is not in operation.

Each boom 22 includes the two elongated wings 30 each of which are about 90 feet long thus providing a total boom length of about 180 feet which with the aid of range nozzles 40 (FIGS. 2, 3 and 10) applies water to an area of about 250 feet in diameter. The system 20 is a low application rate system with each boom discharging about 40 gallons per minute thus permitting a slow rotative boom seed of about ¾ to 1 revolution per minute without danger of exceeding accepted infiltration rates of the soil being irrigated. The preferred application rate of the system is about one-eighth of an inch of water per hour, which rate is also the desired application rate for frost control.

The amount of water spray discharged from each of a plurality of "flat spray" nozzles 44 progressively varies, because of the larger areas which the outer nozzles must irrigate, with the inner nozzles applying about ¾ gallons per minute and with the outer nozzles applying about 8 ½ gallons per minute. Thus, the water is gently sprayed upon plants being irrigated without any danger of hydraulic damage to the plants due to high pressure, high velocity streams of water impacting the plants as might occur when two nozzles discharge water at the rate of 40 gallons per minute which is not unusual with prior art devices.

As best shown in FIGS. 5–7, each boom 22 is solely supported by its mast 24, which mast includes a stationary tubular stake 50 provided with a pointed lower end as shown in FIG. 1 which is driven into the ground to a depth of about 5 feet. The upper end of the stake 50 has a split clamp 52 secured thereon which is rigidly clamped against a stationary tubular water supply conduit 54 having a closed lower end and being connected to the main supply conduit 34 by a branch conduit 56. A lower bearing support 58 having a downwardly and outwardly inclined raceway 60 formed therein is rigidly secured to the outer surface of the stationary conduit 54 and receives a plurality of free balls 62 seated around the periphery of the raceway. An apertured plate 64 having an upwardly directed sleeve 66 thereon is welded to the upper end of the stationary tubular conduit 54 and is provided with an annular groove 68 in its upper face which receives free balls 72 of an upper bearing.

A boom supporting bracket 76 (FIGS. 5 and 6) includes an apertured plate 78 having an annular groove 80 in its lower surface to receive the balls 72. A downwardly directed rotating tube 84 is welded to the plate 78 and has its lower end seated in the lower bearing support in contact with the balls 62. Thus, the balls 62 and 72 and cooperating ball engaging surfaces define anti-friction lower and upper bearings for the rotatable portions of the boom 22.

The boom supporting bracket 76 includes a channel member 86 (FIG. 6) that is secured to the plate 78 and is apertured to freely receive the water supply sleeve 66. The outer ends of the channel 86 receive the inner ends of the two boom wings 30.

Each wing 30 includes an outer structural tube 90 in the form of several 2 inch diameter by 22 foot long tubular sections with four and one-half sections being the preferred number for each wing. The inner end of each structural tube 90 is held in the associated channel 86 by a U-shaped clamp 93. The sections of outer structural tube 90 are connected together by sleeves 94 (FIG. 5) having small diameter central portions 96 against which the adjacent tube ends abut. The sleeves 94 are threaded to receive set screws 98 which firmly grip the tubes at indentations 100. Certain ones of the sleeves 94 have a pair of oppositely projecting short tubular ears 102 (FIG. 7) projecting horizontally therefrom for receiving the lower ends of triangular cable supports 104, which supports are held in place by pins 106. Each sleeve 94 also has a cable attachment hook 108 rigidly secured thereto for receiving associated cables 110 of the guy wire assembly 32.

As illustrated in FIG. 1, the guy wire assembly 32 includes a pair of beams 112 of rectangular tubular cross-section which have their lower ends telescopically received around short upwardly inclined support members 114 (FIG. 6). The members 114 are secured to the bracket 76 and are angled outwardly and upwardly at about 45° in a vertical plane normal to that of the wings 30 as clearly illustrated in FIG. 6. The cables 110 (FIG. 1) are connected to the upper ends of associated ones of each beam 112 and have their opposite ends and/or intermediate portions connected to the upper corners of the several associated triangular supports 104, or to the sleeve supporting hooks 108 (FIG. 5), or to other connecting hooks 116 positioned near the outer ends of the wings 32 all as clearly illustrated in FIG. 1. In addition, the upper ends of the beams are interconnected by another cable 110 to prevent spreading of the same. The length of each cable 110 is determined prior to assembly and is such as to prestress the wings 30 in their upwardly bowed configurations illustrated in FIGS. 1 and 2 to thereby add rigidity to the boom 22. The bowing of the boom also improves the hydraulic balance of the boom as is required at completion of irrigation by causing the water to flow from the outer ends of the boom toward the mast 24 and to rapidly drain from the system through a drain valve 118 (FIG. 6).

A feature of the invention is the provision of a screen housing 124 (FIGS. 5 and 6) which is specifically designed for ease in cleaning and assembly. As will be appreciated, water used for irrigation varies considerably in its purity and frequently carries particles of sand, small rocks and like debris which would clog the nozzles if the water was permitted to flow into the nozzles. The screen housing 124 (FIG. 5) includes an upstanding tubular screen chamber 126 having an apertured flange 128 on its lower end with an internal opening annular groove which receives a packing gland such as a chevron seal 130 having its sealing legs directed upwardly. The previously mentioned water conducting sleeve 66 of the stationary mast conduit 54 is received within the flange 128 and is sealed in fluid tight engagement by the seal 130. A tubular screen 132 has one end centered about the sleeve 66 and has its upper end centered within a bore 134 at the upper end of the screen housing 124. The bore 134 is threaded to receive a large diameter bushing 136 having a blow out valve 138 connected to its upper end. The screen housing 124 also includes apertured downwardly opening outlets 140 which are provided with annular grooves that receive chevron seals 144 having their legs directed upwardly. Upwardly opening sleeves 146 on the inner ends of small diameter water conducting inner wing conduits 148 are received in and sealed by the associated chevron seals 144. As shown in FIG. 6, the drain valve 118 is connected to the screen housing 124 and includes a ball 152 which is moved into sealing engagement with a valve seat 154 by water at irrigation pressure within the screen housing 124, and is moved away from the valve seat 154 by a spring 156 when the water pressure is reduced allowing water to rapidly drain from the system. It is to be understood, however, that the drain valve may be positioned at any point adjacent the mast 24 such as on the stationary mast conduit 54.

As shown in FIG. 6, the screen housing 124 includes ears 156 which receive cap screws 158 that are screwed into nuts 160 welded to the channel 86 to thereby removably attach the strainer housing to the boom supporting bracket 76. With the chevron seal 130 and 144 all having their legs facing upward, it can be seen that the screen housing 124 may be very easily raised from or lowered onto the associated sleeves 66 and 146 with substantially no seal alignment problems. It can also be seen that the screen 132 can be cleaned merely by opening the blow off valve 138 if only a small amount of debris has been collected on the screen 132. If more debris is present, the bushing 136 and blow out valve 138 may be unscrewed from the housing and the screens lifted therefrom for cleaning, or the entire housing 124 may be removed from the boom.

As previously mentioned, the boom irrigation system 20 is a low application rate system and accordingly the inner wing water conducting conduits 148 are of small diameter thereby reducing the volume and accordingly the weight of water during irrigation. Each inner wing conduit is preferably of plastic and includes the associated upwardly opening sleeve 146 which is connected to the upwardly bowed generally horizontal portion of the conduit 148 by an elbow 160. The bowed portion of each inner water conducting conduit 148 is formed from a plurality of half or full pipe sections 162 interconnected by sleeves 164 in water tight relation.

As best illustrated in FIGS. 5 and 7, the spray nozzles 44 are received in openings in the outer supporting sleeves 94 of the structural wing tubes 90 and are screwed to bushings 168 in threaded engagement with the sleeves 164. The nozzles 44 are "flat spray" nozzles which direct water at an angle of about 15° down from the horizontal, and each nozzle sprays about an 11 foot wide annulus. As illustrated in the embodiment shown in FIGS. 2, 3 and 10, the nozzles on one wing 30 (FIG. 3) are preferably spaced about 22 feet apart with the inboard nozzle 44 on one wing being about 11 feet from the axis of rotation of the boom 22, i.e., the vertical axis of the mast 24, while the inboard nozzle of the other wing is spaced about 22 feet from the axis of the mast. It is to be understood, however, that if a greater volume of water is to be discharged on the soil below the boom, or if a finer spray of water from each nozzle is desired, the number of nozzles may be increased and the nozzle spacing may be reduced. For example, one nozzle may be placed every 11 feet on each wing.

As illustrated in FIG. 3, the nozzles 44 on one wing are all oriented to discharge water in a first tangential direction normal to the longitudinal axes of the wings 30 while the nozzles of the other wing discharge the water in the opposite tangential direction thereby providing the primary rotative driving force for the boom 22.

The previously mentioned range nozzles 40 are preferably mounted on the outer end of only one wing 30 and are preferably oriented to discharge the water in a direction parallel to the wing axis but may be angled to aid in driving or retarding the speed of the boom if desired. Two range nozzles 40 are preferably used to provide short and long range nozzles which discharge finer sprays of water than would occur if one range nozzle were used and accordingly more uniformly distributes the water over the outer periphery of the area being irrigated.

It is well known in the art that wind resistance acting on a rotary boom causes variation in torque and speed of the boom. When operating in a high wind, the rate of rotation of the boom is considerably reduced because of wind drag on the boom surfaces especially when the surfaces are perpendicular to the direction of movement of the wind, and causes the boom speed to increase slightly when the boom is parallel to the direction of the wind. It is known that the drag on the boom is proportional to the square of the velocity of the wind acting on the boom. The adverse effect of wind resistance on the boom may be illustrated by the following example. If a wind of 10 miles per hour is acting on the boom, and the midpoint of each wing of the boom is traveling at 5 miles per hour, it will be apparent that the left wing 30 (FIG. 11) will be pushed by air at a net average speed of 5 miles per hour while the right wing will be resisted by air at a net average speed of 15 miles per hour. Since the resistance of the boom is proportional to the square of the average velocity of the wind acting on the boom, it will be seen that the push on the left boom is 25 units while the resistance on the right boom is 125 units.

In order to substantially equalize the wind forces acting on both wings 30 of each boom, it has been discovered that wind engaging flaps 180 (FIGS. 11-14) mounted on each wing at a point adjacent its midpoint, i.e., about 45 to 50 feet from the axis of the mast, will substantially reduce the net air resistance when the area of each flap is about 2 square feet.

In order to use the wind as an aid in rotating the boom 22 as above described, the wind engaging flaps 180 (FIGS. 11-14) are pivotally mounted on the associated wings 30. Each flap 180 includes a panel 182 welded to a sleeve 184 that is journaled on a substantially vertical rod 186 that is clamped to the associated wing 30. Each flap 180 is vertically elongated so that portions of each flap project above and below the associated outer structural tube 90. With the wind blowing in the direction of the arrows in FIGS. 11 and 12, it will be noted that when the wind is normal to the longitudinal axis of the boom as illustrated in FIG. 11, the flap 180 that is moving in the direction of the wind will bear against the associated structural tube 90 thereby applying a driving or wind resisting force to the boom. At this time the boom flap which is moving against the wind will be freely pivoted to a position that is parallel with the direction of movement of the wind. When the boom reaches the position illustrated in FIG. 12, both flaps will weathervane to positions parallel to the wind. As rotation continues, the second mentioned flap will abut the associated structural tube 90 and will increase the wind resistance acting on that wing to substantially equal the wind resistance acting on the other wing as it moves upwind with its flap pivoting freely in the nature of a weathervane.

Another feature of the invention is the provision of boom aligning stands 36 (FIGS. 8 and 9) for holding the boom in alignment with the main supply conduit 34 when the boom is not in operation and for automatically releasing the boom 22 for rotation when water at irrigation pressure is applied to the boom.

Each stand 36 includes a pipe T 190 that communicates with the main supply conduit 34, is connected to the stake 192 having a closed end driven into the ground, and is connected to an upstanding conduit 194 having an open upper end. The stand 36 includes a horizontal plate 196 secured to the stake 192 and connected to the conduit 194 by wires 198. A mounting plate 200 having flanged ends 202 is rigidly secured to the upper end of the conduit 194 and is apertured to slidably receive a pair of elongated bolts 204 and a piston 206 having an O-ring 208 near its lower end. The piston 206 enters the conduit 194 and has a channel shaped carriage 210 rigid with its upper end to which the bolts 204 are attached. Helical compression spring 212 are mounted on the bolts between the mounting plate 200 and washers 206, and normally urges the carriage 210 downwardly to the position illustrated in FIG. 9; whereas water at irrigation pressure urges the carriage 210 upwardly to the position illustrated in FIG. 8. The carriage supports a pair of restraining arms 214 having curved camming surfaces 216 for pivotal movement about rods 218. As shown in FIG. 8, when water under irrigation pressure is directed into the conduit 194, the carriage will be hydraulically raised against the urging of the springs 212 and the restraining arms 214 will gravitate to a generally horizontal position out of the path of movement of the boom wings 30. When the water is turned off, the carriage lowers to the position illustrated in FIG. 9 causing the flanged ends 202 of the mounting plate 200 to cam the arms upwardly to generally vertical positions. A torsion spring 220 is disposed around each pivot rod 218 and bears against the associated restraining arm 214 and carriage 210 to normally hold the arms 214 vertically when the water is turned off. The torsion springs 220, however, permit the arms 214 to deflect from the dotted line position to the full line position when one of the wings 30 swings into align position as indicated in FIG. 9 thus allowing the windmilling boom to automatically enter and be held in desired alignment by the stand 36.

It will be noted that the irrigation system is ideally suited for automatic operation such as by any well known sequencing irrigation system. For example, a sequencing system including timers and sequencing valves could be used to start the pump motor for automatically supplying water to a first row 26 (FIG. 4) of the boom 22 for a predetermined period, and then blocking the supply of water to that row and directing the water into the next row of booms. Such operation can be repeated row-by-row until the entire field has been irrigated without requiring any manual labor or attention since the presence or lack of water pressure determines whether or not the booms will be released for movement or held from movement. It is also, of course, understood that if relatively small fields are to be irrigated and a sufficiently large supply of water is available, that all booms 22 may be simultaneously operated to simultaneously irrigate the entire field.

From the foregoing description it is apparent that the boom irrigation system of the present invention includes a plurality of booms which are permanently placed in the field and which applied water over a wide area at application rates well within the accepted filtration rates of all soils. Each boom is automatically released from alignment stands and is rotated slowly by application of water pressure to the boom system. Each boom includes a small diameter water conduit within a larger diameter structural tube to provide a light weight boom system. Also, wind engaging flaps are provided to aid in rotation of the boom, and a unique easily cleaned and assembled screen housing is provided.

Although the best mode contemplated for carrying out the present invention has been herein shown and described, it will be apparent that modification and variation may be made without departing from what is regarded to be the subject matter of the invention.

What I claim is:

1. A boom irrigation system permanently positioned in a field comprising a mast having a stationary portion and a rotatable portion and defining a vertical axis of rotation, a pair of elongate wings having inner ends secured to said rotatable portion of said mast and extending outwardly therefrom in opposite directions, each wing including an outer tubular structural member and a small diameter inner water conducting member, a plurality of water spray nozzles connected to said inner water conducting member of each wing with the nozzle discharge openings on one wing facing in one tangential direction relative to a circle concentric with the vertical axis of the mast and the nozzle opening on the other wing facing an opposite tangential direction, and means for supplying water at irrigation pressure to said inner water conducting members and nozzles for causing the reaction force of water discharge from said nozzles to rotate said wings slowly about said mast axis and without exceeding the infiltration rate of the soil being irrigated.

2. An apparatus according to claim 1 wherein said boom has a span of between about 40 and 200 feet and rotates at a rate within the range of about ¾ to 1 revolution per minute to apply water to a circular area at a low application rate of a range of about 1/12 to ½ of an inch of water per hour.

3. An apparatus according to claim 1 wherein said stationary portion of the mast forms a part of said water supplying means and includes an upwardly opening water supplying sleeve, wherein each inner water conducting member of said wings includes an upwardly opening water receiving sleeve, and additionally comprising a screen housing having three downwardly opening ports each provided with annular sealing means whereby said screen housing ports can easily be lowered over said sleeves and be sealed thereto by said sealing means, a screen in said housing through which water must flow when moving between said first mentioned and second mentioned sleeves, and means for clamping said screen housing to said stationary mast portion.

4. An apparatus according to claim 1 wherein spray nozzles on one wing are positioned to spray water on the soil in spaced concentric rings and wherein the spray nozzles on the other wing are positioned to spray water on the soil in rings between the first mentioned rings with a certain amount of overlap to assure complete coverage of the area below said wings.

5. An apparatus according to claim 1 wherein a guy wire assembly is provided to support said wings, said guy wire assembly comprising a pair of beams connected to the rotatable portion of said mast and directed upwardly and outwardly from both sides of said mast in a vertical plane extending transversely of said wings, a plurality of triangular supports connected to each wing, and a plurality of cables interconnecting the upper ends of said beams with said triangular supports and said outer structural tubular members for prestressing said wings in an upwardly bowed configuration.

6. An apparatus according to claim 1 wherein means are provided for maintaining said wings in an upwardly bowed position, and a pressure responsive water drain valve included in said water supply means at a point adjacent said mast for rapidly draining water from said wings in response to a water pressure less then said irrigation pressure.

7. An apparatus according to claim 3 wherein at least the annular sealing means associated with said water receiving sleeves are chevron seals having upwardly opening legs.

8. An apparatus according to claim 3 wherein means are provided for maintaining said wings in an upright bowed position, and a pressure responsive water drain valve connected to said screen housing and operable to open and drain water from said wings in response to a substantial reduction of the pressure of water in said water conducting wing members relative to said irrigation pressure.

9. An apparatus according to claim 2 and additionally comprising a range nozzle on the outer end of one of said wings for increasing the irrigated area to that of a circle having a diameter of about 250 feet.

10. An apparatus according to claim 1 and additionally comprising boom alignment means connected in flow communication with said water supply means, said alignment means being responsive to a water pressure less than the irrigation pressure for holding said boom in a predetermined position of alignment and responsive to water at irrigation pressure to release said boom for rotation.

11. An apparatus according to claim 1 and additionally comprising a boom alignment stand connected in flow communication with said water supply means, said alignment stand including a pair of boom engaging restraining arms movable between an upstanding boom restraining position in the path of movement of said boom wings and an inactive position disposed below said path of movement, and water pressure responsive means for moving said restraining arms from said inactive position to said restraining position in response to water pressure in said water supply means equal to that required for irrigation.

12. An apparatus according to claim 11 and additionally comprising resilient means connected to each of said boom engaging restraining arms for allowing each arm to pivot toward the other arm upon being contacted by a wing of said boom when windmilling for stopping said wing in a position between said arms.

13. An apparatus according to claim 1 wherein said water supply means includes an elongated supply pipe, a plurality of said boom irrigation systems being permanently positioned in a row parallel to and adjacent said pipe, a boom alignment stand associated with each boom, each alignment stand being connected in flow communication to said supply pipe and being permanently positioned adjacent said pipe in alignment with said booms, each alignment stand including a pair of boom engaging restraining arms movable between an upstanding boom restraining position in the path of movement of said boom wings and an inactive position disposed below said path of movement, and water pressure responsive means for moving said restraining arms from said inactive position to said restraining position in response to water pressure in said water supply means equal to that required for irrigation.

14. An apparatus according to claim 2 wherein said water supply means includes an elongated supply pipe, a plurality of said boom irrigation systems being permanently positioned in a row parallel to and adjacent said pipe, a boom alignment stand associated with each of said booms and being connected in flow communication to said pipe and disposed in alignment with said booms, each alignment system comprising a post driven in the ground for permanently supporting the stand, an upstanding water containing conduit communicating with said elongated pipe and having an upper open end, a mounting plate rigidly connected to the upper end of said upstanding water containing conduit, a piston received in the open end of said conduit, a carriage secured to the upper end of said piston, resilient means normally urging said carriage downwardly, a pair of boom restraining arms pivotally mounted on said carriage and having curved camming surfaces engaging said mounting plate, said camming surfaces allowing said arms to pivot downwardly out of the path of movement of said boom when water at irrigation pressure raises said carriage against the urging of said resilient means, said resilient means being effective for lowering said carriage upon termination of said irrigation pressure causing said camming surfaces to engage said mounting plate and cam said retaining arms into the path of movement of the boom, and resilient means connected to each arm for allowing one arm to pivot toward the other arm in response to being contacted by the windmilling boom for allowing the boom to come to rest between said arms in a position substantially parallel to said elongated water supply pipe.

15. An apparatus according to claim 2 and additionally comprising upright pivot means connected to each wing, a vertically disposed wind engaging flap pivoted to each pivot means for movement within a pivotal range of about 180° relative to the associated pivot means, each flap being pivoted from a position wherein the wind will cause one side of said flap to contact the associated outer tubular structure member of said associated wing to aid in rotating the boom when said flap is on the up wind side of said associated wing, to a plurality of weather-vaning positions when said flap is on the downwind side of said associated wing.

16. An apparatus according to claim 15 wherein the area of each of said flaps is in excess of about 1 square foot and wherein each flap is positioned beyond about 20 feet outwardly from the axis of rotation of the boom.

17. A boom irrigation system positioned in a field comprising a mast having a stationary portion and a rotatable portion defining a vertical axis of rotation, a pair of elongated water conducting wings having inner ends secured to said rotatable portion of said mast and extending outward therefrom in opposite directions, a plurality of water spray nozzles connected to said water conducting wings with the nozzle discharge openings on one wing facing in one tangential direction relative to a circle concentric with the vertical axis of the mast and the nozzle openings on the other wing facing an opposite tangential direction, means for supplying water at irrigation pressure to said inner water conducting members and nozzles for causing the reaction force of water discharged from said nozzles to rotate said wings slowly about said mast axis, and a wind engaging flap pivoted to each wing for movement within a pivot range of about 180° relative to the associated pivot means, each flap being pivoted from a position wherein the wind will cause one side of the flap to be held in a position substantially parallel to the associated wing to aid in rotating the boom when said flap is on the upwind side of said associated wing, to a plurality of weather-vaning positions when said flap is on the downwind side of said associated wing.

18. An irrigation system positioned in a field comprising an elongated water supply pipe, means for directing water at high pressure into said supply pipe, a plurality of irrigation booms being permanently positioned in a row parallel to and adjacent said pipe, each irrigation boom including a rotatable portion having parallel elongated wings directed outwardly in opposite directions from its axis of rotation, spray nozzles on each wing for discharging water on the field, means for rotating the rotatable portion of each boom, and boom alignment means associated with each boom for holding the wings of each boom in a position generally parallel to said supply pipe when the irrigation system is not irrigating a field.

19. An apparatus according to claim 18 wherein said boom alignment means is connected in flow communication with said water supply pipe, said alignment means being responsive to a water pressure less than the irrigation pressure for holding said boom wings in alignment with said supply pipe, and responsive to water at irrigation pressure to release said booms for rotation.

* * * * *

UNITED STATES PATENT OFFICE
CERTIFICATE OF CORRECTION

PO-1050
(5/69)

Patent No. 3,724,758      Dated April 3, 1973

Inventor(s) Fitzmaurice, Richard W.

It is certified that error appears in the above-identified patent and that said Letters Patent are hereby corrected as shown below:

On the face of the patent, column 1, in the line following "United States Patent" change the name "Fizmaurice" to -- Fitzmaurice --.

On the face of the patent, column 1, in the line beginning with /¯75_7 change "Fizmaurice" -- Fitzmaurice --.

Column 2, line 62 change "seed" to -- speed --.

Signed and sealed this 11th day of February 1975.

(SEAL)
Attest:

RUTH C. MASON
Attesting Officer

C. MARSHALL DANN
Commissioner of Patents
and Trademarks